(12) United States Patent
Charles et al.

(10) Patent No.: US 11,820,089 B2
(45) Date of Patent: Nov. 21, 2023

(54) BAG WITH COLOURED SHEET FOR REPAIRING COMPOSITE PANELS, AND COLOURATION AND REPAIR METHOD

(71) Applicants: AIRBUS SAS, Blagnac (FR); Airbus Operations S.A.S., Toulouse (FR)

(72) Inventors: Julien Charles, Blagnac (FR); Franck Dobigeon, Toulouse (FR); Guillaume Ferrer, Blagnac (FR); Anthony Rince, Toulouse (FR)

(73) Assignees: AIRBUS SAS; Airbus Operations S.A.S.

( * ) Notice: Subject to any disclaimer, the term of this patent is extended or adjusted under 35 U.S.C. 154(b) by 387 days.

(21) Appl. No.: 17/092,696

(22) Filed: Nov. 9, 2020

(65) Prior Publication Data

US 2021/0146642 A1    May 20, 2021

(30) Foreign Application Priority Data

Nov. 18, 2019   (FR) ..................................... 19 12822

(51) Int. Cl.
*B29C 35/00*       (2006.01)
*B29C 73/00*       (2006.01)
(Continued)

(52) U.S. Cl.
CPC .............. *B29C 73/10* (2013.01); *B29C 35/08* (2013.01); *B29C 2795/002* (2013.01); *B29K 2995/002* (2013.01); *B29L 2031/3076* (2013.01)

(58) Field of Classification Search
CPC ......... B29C 35/00; B29C 35/08; B29C 73/00; B29C 73/08
See application file for complete search history.

(56) References Cited

U.S. PATENT DOCUMENTS

| 2013/0052422 A1* | 2/2013 | Ohya ................ B29C 45/14827 |
| | | 428/156 |
| 2014/0110887 A1* | 4/2014 | Horiuchi ............. B29C 35/0805 |
| | | 264/413 |
| 2017/0028655 A1* | 2/2017 | Ferrer ..................... B29C 73/08 |

FOREIGN PATENT DOCUMENTS

| DE | 102004062064 A1 | 7/2006 |
| FR | 3039452 A1 | 2/2017 |

OTHER PUBLICATIONS

French Search Report for Application No. 1912822 completed on Aug. 24, 2020, 2 pages (p. 1 categorizing the cited references).

* cited by examiner

*Primary Examiner* — Jacob T Minskey
*Assistant Examiner* — Matthew Hoover
(74) *Attorney, Agent, or Firm* — Lerner David LLP

(57) ABSTRACT

An assembly includes a bag and of a composite panel exhibiting a damaged region to be repaired by polymerization of a repair piece using the bag. The bag includes a sheet intended to be laid over the panel. When the panel and the sheet are laid one atop of the other, the sheet exhibits regions capable of absorbing heat emitted by radiation onto it in a proportion that is dependent on the polymerization temperature needed for that region of the panel that corresponds to it, the radiation being partially absorbed by suitable colouration of the sheet in the region concerned. Determining those regions of the panel in which radiation is less well absorbed than in others means that the heating can be adapted to suit the needs of polymerization in terms of repair and that even polymerization can thus be obtained over the entire damaged region, thereby consolidating the repair.

7 Claims, 4 Drawing Sheets

(51) Int. Cl.
*B29C 73/10* (2006.01)
*B29C 35/08* (2006.01)
*B29L 31/30* (2006.01)

[Fig. 1]
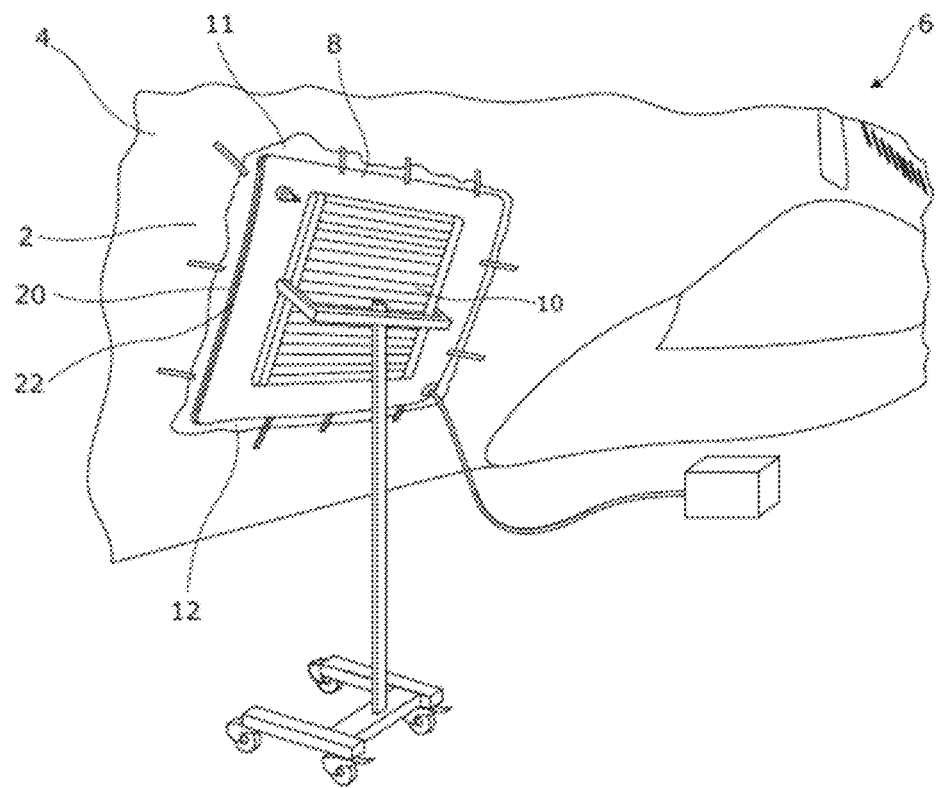
[Fig. 2]
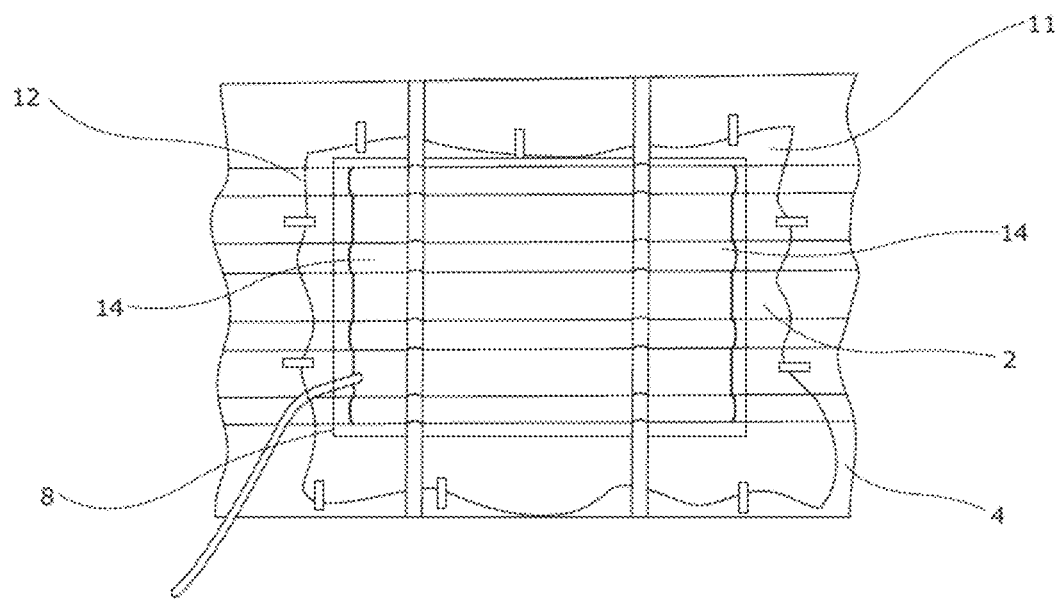

[Fig. 3]
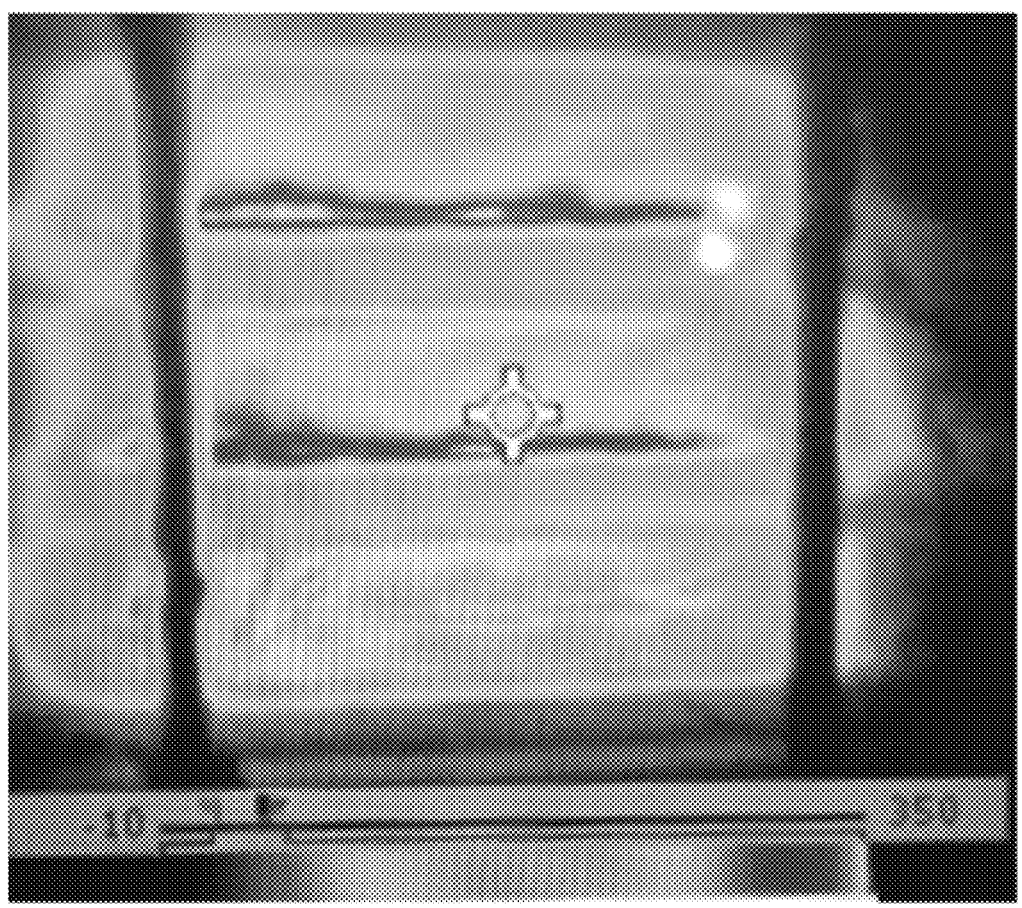

[Fig. 4]
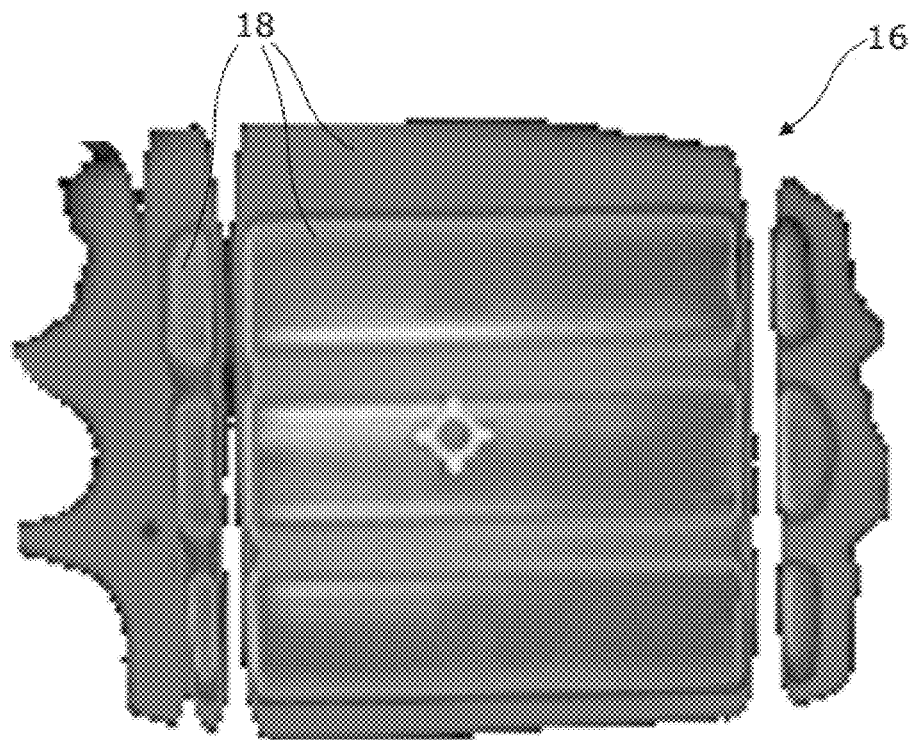

[Fig. 5]
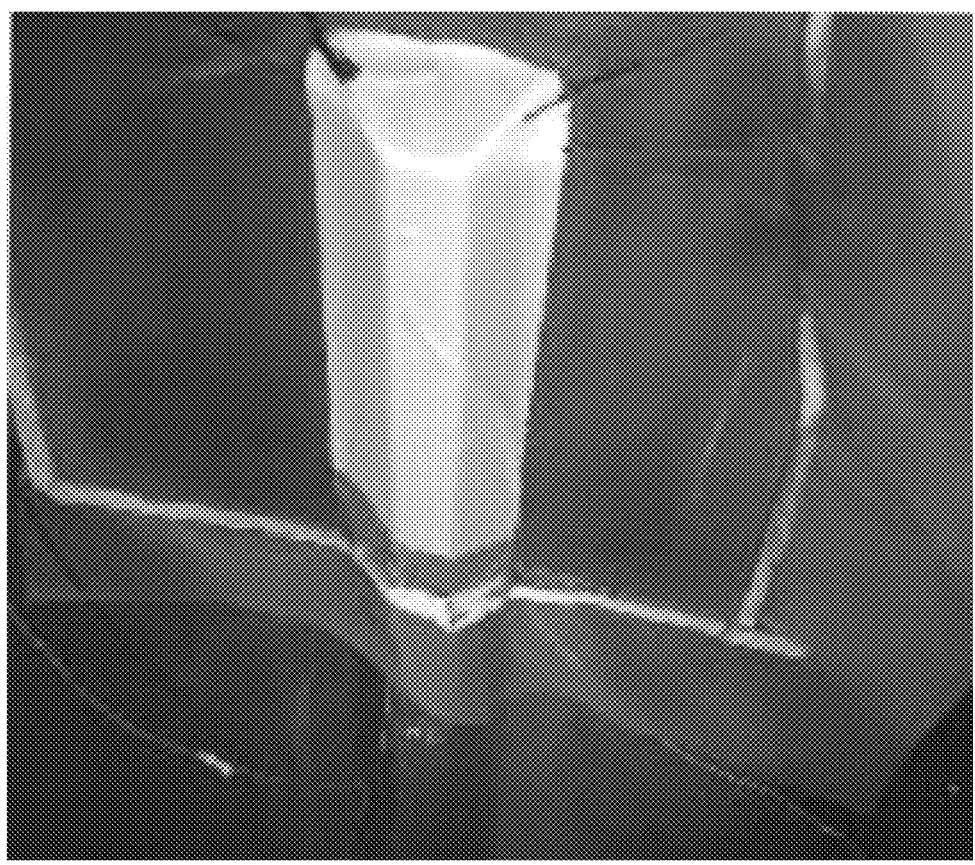

BAG WITH COLOURED SHEET FOR REPAIRING COMPOSITE PANELS, AND COLOURATION AND REPAIR METHOD

FIELD OF THE INVENTION

The invention relates to tooling and, more particularly, to a sheet used to repair a composite panel and to a repair method using such a sheet. The present invention also relates to the method for colouring the said sheet and to the method for repairing the panel.

BACKGROUND OF THE INVENTION

During the course of operation, aircraft may exhibit regions made of composite material that have become damaged and require repair.

A method for repairing a composite panel using a heated covering to polymerize a repair piece made, for example, of new plies of composite material in order to fix it to the panel is known from patent application FR3039452. However, the heated covering offers a more or less uniform temperature across its entire surface. Now, the temperature needed for suitable polymerization is dependent upon the geometry of the panel, such as, for example, upon its thickness which might not be identical across the entire extent of the region to be repaired or, to give another example, dependent on the reliefs, cavities or other geometric configurations that cause the heat to dissipate or to accumulate, such as the presence of stiffeners with hollows forming heat sinks that accumulate heat, or else the presence of materials acting as heat sinks which accumulate heat in small spaces such as, for example, the cells of a foam or of a honeycomb material or the like, or else dependent on any other feature of the panel such that the temperature differs from one region to another. Because of the uniformity of the thermal power diffused by the heated cover, the temperature differences at the level of the panel and which are due to particular geometric configurations lead to polymerization that is nonuniform across the entire surface of the region to be repaired, and this leads to a repair which is not as strong.

BRIEF SUMMARY OF THE INVENTION

An aspect of the present invention proposes tooling that is able to alleviate these disadvantages and distribute the panel heating temperature according to the needs of polymerization in the heated region concerned.

An aspect of the present invention relates to an assembly of a bag and of a composite panel exhibiting a damaged region to be repaired by polymerization of a repair piece using the bag, the bag comprising a sheet intended to be laid over the panel, characterized in that when the panel and the sheet are laid one atop of the other, the sheet exhibits regions capable of absorbing heat emitted by radiation onto it in a proportion that is dependent on the polymerization temperature needed for that region of the panel that corresponds to it, the radiation being partially absorbed by suitable colouration of the sheet in the region concerned.

In this way, the heating temperature is distributed over the surface of the panel according to need and is no longer the same everywhere. The sheet exhibits different coloured regions corresponding to corresponding regions of the panel that require different polymerization temperatures: this results in more uniform polymerization.

Aspects of the invention anticipates at least one of the following optional features, considered in isolation or in combination.

The sheet is heat sensitive or comprises a heat sensitive film and, when subjected to means of heating by radiation, exhibits regions of different colours corresponding to corresponding regions of the panel that require different polymerization temperatures.

The different colours at least partially consist of part-tones of black and white.

Those regions of the sheet that are intended to be laid over corresponding regions of the panel that require a lower polymerization temperature exhibit lighter colours and conversely those regions of the sheet that are intended to be laid over regions of the panel that require a higher polymerization temperature exhibit darker colours.

The colours of the regions of the sheet have been obtained by the application of pigments or colourants.

The colours of the regions of the sheet have been obtained by printing.

The bag comprises a covering that is white in colour.

The present invention also relates to a method for colouring the sheet of the said assembly having the features listed hereinabove, characterized in that it comprises the following steps: temporary heating of the said panel by radiation; detection of the temperatures at least over the entire damaged region to be repaired; definition of the regions of different colours according to the temperatures measured; application of the colours in the defined regions.

According to one alternative, the method for colouring the sheet of the said assembly is characterized in that it comprises the following steps: thermal simulation of the damaged region to be repaired; detection of the temperatures at least over the entire region to be repaired; definition of the regions of different colours according to the temperatures obtained by simulation; application of the colours in the defined regions.

Aspects of the invention anticipates at least one of the following optional features, considered in isolation or in combination.

The application of the colours employs pigments or colorants.

The application of the colours is performed using printing.

The present invention also relates to a method for repairing a panel of an assembly exhibiting the features listed hereinabove using the sheet of the said assembly, characterized in that it comprises a step of applying the sheet under vacuum to the panel and a step of heating the said sheet by radiation using heating means.

A covering that is white in colour may be inserted between the sheet and the panel.

BRIEF DESCRIPTION OF THE DRAWINGS

Further features and advantages will become apparent from the following description of the invention, which description is given by way of purely nonlimiting example, with reference to the attached drawings in which:

FIG. 1 is a perspective view of a damaged panel on the outside of the fuselage of an aircraft under repair, and on which a sheet is laid;

FIG. 2 is a view of a damaged panel on the inside of the fuselage of an aircraft under repair, on which a sheet is laid;

FIG. 3 is a view of an example of an image obtained by a thermal camera of a panel exposed to means of heating by radiation, the colours of which appear only in part-tones of black and white, the coldest temperatures normally being blue in the image and grey in the figure and the hottest temperatures being red in the image and black in the figure;

FIG. 4 is a view of the model of coloured regions that is obtained from the thermal image of FIG. 3;

FIG. 5 is a partial perspective view of a sheet laid on a panel under repair in a different region from that of FIG. 2.

DETAILED DESCRIPTION

The present invention is illustrated in what follows using the example of a damaged composite panel 2 of the fuselage 4 of an aircraft 6. However, it is not restricted to this application and may relate to any type of damaged composite panel of an aircraft or even of another vehicle of the automobile, ship, train or other type, or else of any type of equipment in any type of field, such as, by way of example, wind power, sport, leisure, etc.

As illustrated in FIG. 1, the fuselage 4 of an aircraft comprises a panel 2 formed of a composite skin which is damaged over an entire region 8, hereinafter referred to as the damaged region. The region 8 is shown in FIGS. 1 and 2 in solid line to make it easier to see, but as this region is under the sheet, it would not normally be visible. The region 8 may just as well be on the outside of the fuselage (FIG. 1) as on the inside (FIG. 2), or else again on both sides when the damage passes all the way through. The term "panel" refers generically to any element exhibiting a damaged region and belonging to a more extensive system which in the example illustrated is an aircraft fuselage. The panel 2 is made of composite material formed of at least reinforcers (fibres, particles, etc.) and of a matrix in which the reinforcers are embedded. The matrix concerned in the example illustrated is an organic matrix, more particularly a polymer resin. Numerous methods for repairing the damaged region of a composite panel, particularly in situ, are known and do not form the subject of the present invention. They involve polymerizing a repair piece with the damaged panel. The repair method of the present invention employs means 10 of heating by radiation such as for example UV lamps or use of infrared. Most in-situ repair methods like the one illustrated in the patent mentioned earlier employ a bag 11 comprising a sheet 12 to hold the repair piece in place in the damaged region 8 of the panel during heating so that the piece can be fixed to the panel by the polymerization of the resin. The bag 11 is installed on the panel (and the repair piece) under vacuum to reinforce retention. In certain embodiments, the bag 11 is confined to the sheet 12. In other embodiments as will be seen later, the bag 11 may comprise other components.

The concept behind the tooling according to an embodiment of the present invention is to allow the heat to which the panel 2 is subjected to be distributed differently over the entire surface of this panel according to the temperature needed to obtain uniform polymerization of the repair piece with the panel and consolidation which is thereby reinforced. If the polymerization temperature is too low, polymerization is insufficient and the repair will be unable to withstand the usual conditions to which an aircraft is subjected. If the polymerization temperature is too high, the resin may burn and not only will the repair have to be repeated in its entirety, but the damage may also have been worsened.

As seen previously, a panel 2 is generally not shaped as a perfectly curved parallelepiped; often, the thickness of the panel 2 varies according to the environmental demands such as, for example, additional loads applied locally.

It may also be that specific requirements, such as increasing stiffness or reinforcing the structure or else filtering noise require the introduction of additional material, such as a layer of honeycomb to improve stiffness or filter out certain frequencies.

Other devices or systems may be added to the simple panel. Thus, to quote one example, stiffeners 14 (visible in FIG. 2) may be attached to the skin of the fuselage. In the example illustrated in FIGS. 1 to 3, the panel 2 has stiffeners 14 (depicted in FIG. 2). Because the bag 11 (and the sheet 12) are laid under vacuum on the panel 2, it conforms to the shapes of the panel 2 and, as shown in FIG. 2, the reliefs such as those formed by the stiffeners 14 are evident underneath the bag 11. Their precise shape is hidden in the figure by the bag 11 but these are hat-section stiffeners. Inside the hat shape of the stiffener 14 the heat builds up and the temperature at the stiffeners 14, even if applied uniformly to the entire surface of the panel, is therefore greater in the region of the stiffeners. As a result, there is no need to diffuse as much heat in the region of the stiffeners as over the rest of the surface of the panel because otherwise the heat in the region of the stiffeners may become excessive and lead to the disadvantages described above.

It would therefore be advantageous to be able to adapt the temperature of the heat emitted by the radiation according to that which is rendered necessary by the local configuration of the panel.

In order to distribute the heat in a controlled manner, the idea is to use heat by radiation which is uniform over the entire surface of the damaged region 8 and to filter said radiation in a proportion that is determined according to the precise point on the panel to which it is applied.

It is known that some of the radiation received by an object is absorbed and converted into heat energy. A greater or lesser proportion of the radiation is absorbed/reflected according to the material of the object, the appearance of its surface, but also according to its colour. Black is known to absorb the radiation received and to heat up the object whereas white is known to lead to significant reflection.

An aspect of the present invention includes using a sheet 12 exhibiting different colours so that only a determined proportion of the heat applied to it by radiation is projected, depending on the colour concerned. The colour chosen depends on the desired proportion of the heat to be filtered out locally in order to obtain, at the specific exposed point on the panel, the temperature necessary for polymerization. This results in a colour model 16 for the sheet 12, which model is specific to the panel 2 that is to be repaired. The colour regions 18 of the model 16 are entirely dependent on the panel 2 that is to be repaired, on its geometric configuration and on its resulting needs with regard to polymerization temperature.

In the present description, the term colour refers for example to a hue, black, blue, red, etc., but may also refer to a shade, namely light, dark. Thus, in one particular example, the sheet 12 has colour regions 18 of various hues. Further, according to another example, depicted in FIG. 4, the sheet comprises only part-tones of black and white, namely shades of grey without other colours: the regions vary in darkness or lightness and each colour therefore corresponds to a shade of grey (light grey, dark grey, etc.).

The model 16 is based on the reflection/absorption power of the said colour (hue or shade). Thus, in a part-tone scale of black and white, the dark shades, namely those close to black or dark grey, reflect heat less: these are therefore applied to the cooler regions of the panel that need to be heated up in order to reach the polymerization temperature of the resin. In contrast, the light shades, namely those close to light grey or to white, reflect heat more and are applied to those regions of the panel that are hotter so that they are not heated up any more than necessary.

Black, considered as being the darkest shade, is not necessarily the colour most effective at heating up a region. Thus, navy blue proves to be more effective than black.

In order to determine the colour regions 18 of the sheet 12 it is necessary to give due consideration to the polymers, pigments or other elements of which it is composed and which need to be able to withstand the temperature. In other words, the colours chosen for the sheet with regard to the panel that is to be repaired must not increase the absorption power thereof so far as to attain a sheet temperature that might damage it, given its construction.

The sheet is of the type known to those skilled in the art; it may be made from a plastics material very similar to nylon able to withstand thermal and chemical stresses, for example of IPPLON® (registered tradename) and more particularly IPPLON® KM1300 or Capran® (registered tradename) and more particularly CAPRAN® 980.

The remainder of the description will be concerned with the method for colouring the sheet and more specifically the steps for creating the colour regions 18.

A first method for creating the regions 18 consists first of all in determining them and then, once they have been determined, in creating them on the sheet. A second method combines the steps into a single step, namely that of creating the regions simultaneously with determining them.

Regarding the first method, there are a number of possible embodiments for determining just as for creating the regions.

A first embodiment for determining the colour regions comprises a step of detecting the temperatures at the panel 2 when it is subjected to means 10 of heating by radiation. Using the set of detected temperatures, a temperature map of the panel is created. From this map, colour regions are designed onto the sheet.

According to one particular embodiment for detecting the temperatures, use is made of a thermal camera (other means such as temperature probes may suffice). The panel 2 is heated by the means 10 of heating by radiation for a very short period of time for just long enough to establish the abovementioned map.

It is also possible, according to a second embodiment, to create the temperature map using software means. There are numerous tools in existence these days for simulating the temperature behaviour of a composite panel. All that is therefore required is to simulate the physical experiment descried in the first embodiment, namely the heating of the panel, in order to obtain the desired map.

From the map of the temperatures which are obtained physically in the first embodiment or by simulation in the second embodiment, the colour regions 18 are deduced. The thermal camera gives an image of the colour regions 18, as shown by FIG. 3: the real image is in colour but has been depicted here in black and white. Thus, the image in the lowest temperatures is in blue (grey in the figure) and red in the highest temperatures (black in the figure). It can be seen from FIG. 3 that the highest temperatures are in the region of the stiffeners as was seen earlier.

Once the colour regions 18 have been determined, they are then created on the sheet. In one embodiment, the colour regions of the sheet may be obtained by the application of pigments or colourants. Application is considered in a very generic sense and encompasses deposition, impregnation or any other action that allows the sheet 12 to be coloured using pigments or colourants. Another application example given in what follows is printing which can be likened to deposition. Other examples include dyeing, painting, etc. It might also be possible to design the sheet directly with different colour regions. According to one embodiment, the definition of the model 16 (namely the colour regions 18) is captured in a black and white or colour printer depending on the colour model as depicted in FIG. 4, and the sheet is printed.

The colouring of the sheet according to a determined colour model could also employ the screen printing technique.

During printing, position reference marks 19 are provided so as to allow the sheet to be superposed precisely on the panel so that the colour regions correspond to the associated regions of the panel. These reference marks may be multiple reference marks such as windows, the axes of stiffeners (the axis 19 for example in FIG. 2), extremities of the panel (edge 19 as another example of the panel 2 in FIG. 1), points of reference, etc.

FIG. 5 partially depicts a sheet produced from an image obtained by a thermal camera, in the process of being used. All the regions corresponding to those regions of the panel that have been identified as hot in relation to the rest of the panel, namely in which the temperature is above a threshold S1 determined by the operator are coloured in white. In the example illustrated in FIG. 5, this refers to the hollow structure that the stiffener constitutes. All the regions corresponding to those regions of the panel that are identified as being cold in relation to the rest of the panel, namely in which the temperature is below a threshold S2 determined by the operator are coloured in black. As seen earlier, using a colour printer, they could be coloured in dark blue. All those regions of the panel that have been identified as being neither hot nor cold, in comparison with the rest of the panel, namely regions in which the temperature is above the threshold S2 and below the threshold S1 are coloured in shades of grey. In the example illustrated in FIG. 5, there are no regions coloured grey, only black and white.

As was seen above, it is possible to employ a second method to determine the colour regions 18 and to colour the sheet 12 simultaneously. The method for colouring the sheet consists in using a heat-sensitive film 20 the colour of which changes with temperature and, in the case of interest here, the colour of which lightens when the region is hotter and conversely darkens when the region is colder. The heat emitted by the sheet 12 then differs according to the colour regions 18 obtained. The film 20 is then either used as the sheet 12, if it has sufficient properties to fulfil that same role, or superposed on the said sheet 12. In the latter case, the film 20 constitutes an additional layer between the sheet 12 and the panel 2 and the film 20 and the sheet 12 are considered to constitute an assembly referred to generically in the description by the term sheet. This method does not require any positional indicators, unlike the previous method.

According to one particular embodiment of the invention, the bag 11 comprises a covering 22 that is white or light in colour and that is superposed on the sheet 12 to improve the colour contrast between the regions 18. The covering may be made for example using glass repair fabric.

The repair method comprises a step of fitting a bag 11 comprising a sheet 12 that is coloured as explained hereinabove or able to take on colour (with or without the addition of the heat-sensitive film 20 depending on the embodiment) at least over the damaged region 8. The sheet 12 covers the repair piece and is connected to the panel in a fluid-tight manner. The positioning reference marks 19 on the sheet 12 allow it to be centred with respect to the panel so that the regions 18 of the sheet become superposed with the corresponding regions of the panel (more particularly in the area of the damaged region 8). Means 10 of heating by radiation are installed in such a way as to diffuse heat over the entire surface of the region 8. As shown in the example of FIG. 1, infrared lamps are installed on the ground supported by a tripod and raised to the height of the region 8 so as to diffuse heat over the entire surface thereof. Vacuum-application means of known type are activated to evacuate the bag 11 and remove the gases present in the volume delimited by the bag and the panel thus holding the repair piece against the panel 2. The piece and the panel will not be described in further detail because they are dependent on the chosen repair method. It is possible to insert the covering 22 between the sheet 12 and the panel 2, as was seen above. The bag 11 therefore comprises the sheet 12 and the covering 22.

When the lamps 10 are switched on, heat is diffused by radiation onto the bag 11 and therefore onto the sheet 12. The radiation is reflected and absorbed in proportions dependent on the colour of the region 18 of the sheet and the resin is polymerized uniformly over the entire surface of the damaged region 8. Because a better temperature distribution on the panel is obtained, the polymerization temperature is uniform over its entire surface and the resulting mechanical properties are better.

The heating means are simple and quick to set up because they are confined to simple radiative heating means, the sheet already being used in repair methods. The repair method does not require any level of expertise. There is no longer any need to apply additional heating means such as hot air locally for the colder regions of the panel.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly of a bag and a composite panel exhibiting a damaged region to be repaired by polymerization of a repair piece using the bag, the bag comprising a sheet configured to be laid over the panel, wherein when the panel and the sheet are laid one atop of the other, the sheet exhibits regions configured for absorbing heat emitted by radiation onto the sheet in a proportion that is dependent on the polymerization temperature needed for that region of the panel that corresponds to the sheet, wherein the radiation is partially absorbed by suitable colouration of the sheet in the region concerned.

2. The assembly according to claim 1, wherein the sheet is heat sensitive or comprises a heat sensitive film and, when subjected to heating by radiation, exhibits regions of different colours corresponding to corresponding regions of the panel that require different polymerization temperatures.

3. The assembly according to claim 1, wherein the different colours at least partially comprise part-tones of black and white.

4. The assembly according to claim 1, wherein the regions of the sheet that are configured to be laid over corresponding regions of the panel that require a lower polymerization temperature exhibit lighter colours and the regions of the sheet that are configured to be laid over regions of the panel that require a higher polymerization temperature exhibit darker colours.

5. The assembly according to claim 1, wherein the colours of the regions of the sheet have been obtained by the application of pigments or colourants.

6. The assembly according to claim 1, wherein the colours of the regions of the sheet have been obtained by printing.

7. The assembly according to claim 1, wherein the bag comprises a covering that is white in colour.

* * * * *